June 13, 1961 P. M. MAZUR 2,988,046
SELF-FEEDING STORAGE STRUCTURES
Filed April 5, 1955 3 Sheets-Sheet 1
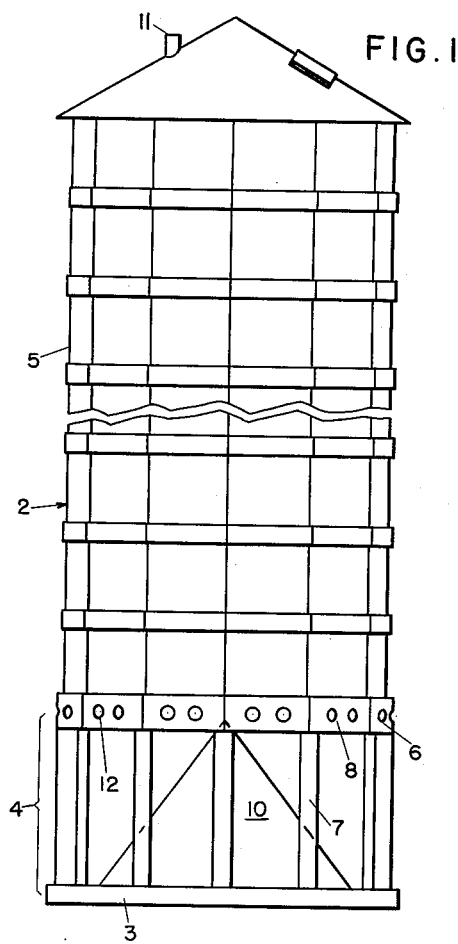
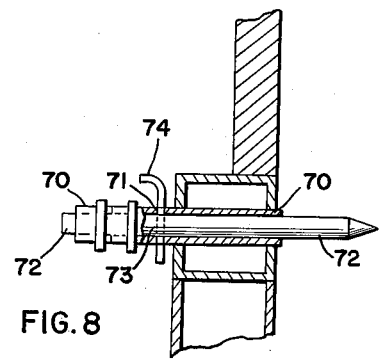
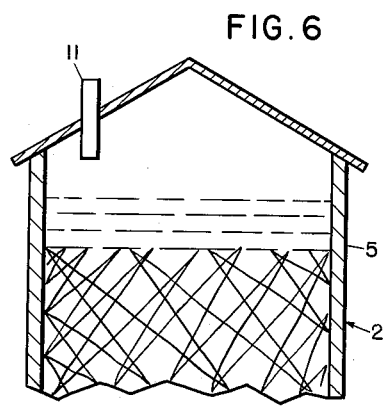
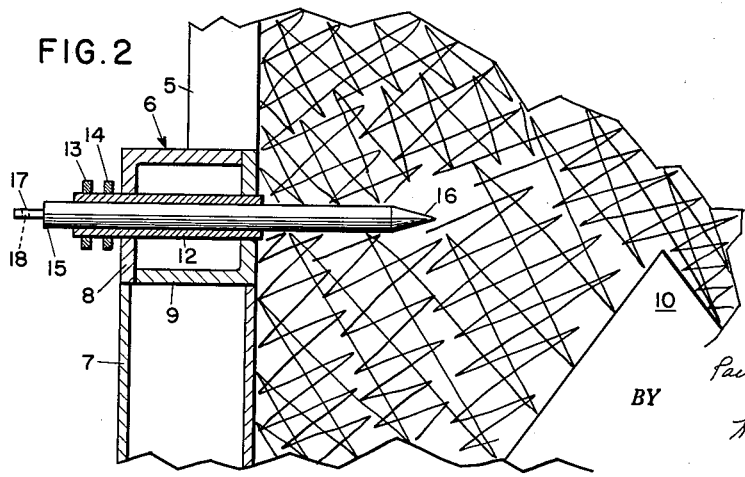
INVENTOR.
Paul M. Mazur
BY Herman Seid
atty.

June 13, 1961  P. M. MAZUR  2,988,046
SELF-FEEDING STORAGE STRUCTURES
Filed April 5, 1955  3 Sheets-Sheet 2

INVENTOR.
Paul M. Mazur
BY Herman Seid
Atty.

June 13, 1961 P. M. MAZUR 2,988,046
SELF-FEEDING STORAGE STRUCTURES
Filed April 5, 1955 3 Sheets-Sheet 3
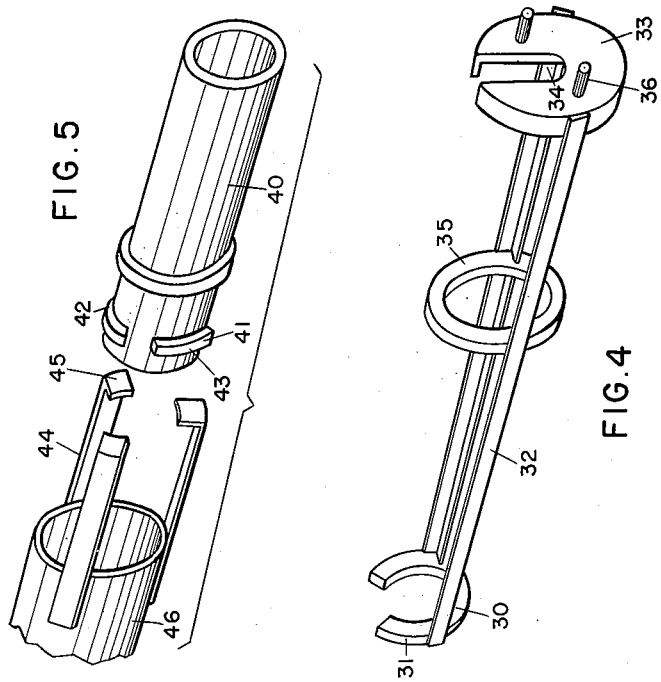
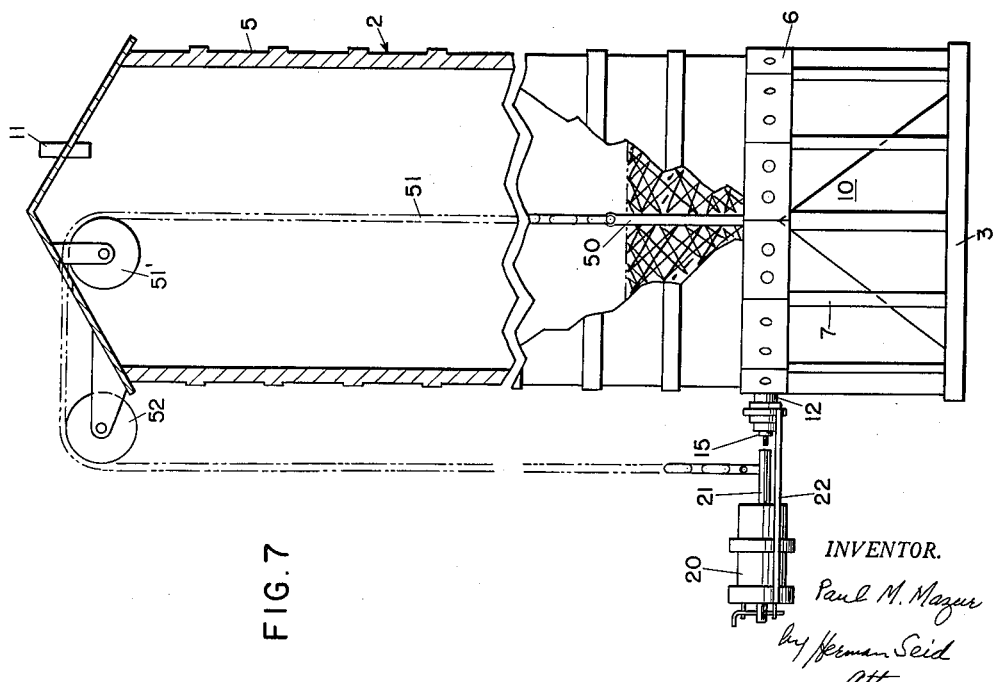
INVENTOR.
Paul M. Mazur
by Herman Seid
atty.

United States Patent Office 2,988,046
Patented June 13, 1961

2,988,046
SELF-FEEDING STORAGE STRUCTURES
Paul M. Mazur, Fiddlers Creek Farm, Titusville, N.J.
Filed Apr. 5, 1955, Ser. No. 499,319
8 Claims. (Cl. 119—52)

This invention relates to a storage structure for the storage of silage and like foodstuffs from which animals may self-feed and, more particularly, to a self-feeding silo containing pins or splines adapted to support silage thereon and to regulate downward flow of silage in the silo having hydraulic mechanism adapted to be placed adjacent the wall of the silo to urge pins inwardly of the silo into the mass of silage and to retract the pins as desired to regulate downward flow of the silage.

In my Patent No. 2,752,884, granted July 3, 1956, there is disclosed a self-feeding structure in which pins or splines are provided to support silage within the structure and to regulate downward flow of silage within the structure. The structure disclosed in this application includes a partition member which may be employed during the silo filling operation to provide lines of cleavage between adjacent masses of silage.

Ordinarily, the pins or splines are driven in the silage mass by mallets or the like or if threaded pins are employed which engage nuts welded to the structure, the pins are moved inwardly by engaging the head of each pin with a large wrench to rotate the pin. Each of these structures requires a great deal of time and arduous labor to place the pins in desired position. It will be apparent that some simple, inexpensive mechanism to drive the pins and to retract the pins to regulate silage movement is needed badly.

The chief object of the present invention is to provide a storage structure for the storage of silage and like materials from which animals may self-feed containing removable means to support the silage therein and to regulate downward flow of the silage in which hydraulic mechanism is provided to drive the means within the silage and to retract the same as desired to regulate downward flow of the silage.

An object of the invention is to provide hydraulic mechanism for driving pins or splines through the supporting walls of a silo to support silage therein and to regulate downward flow of silage within the silo.

A further object is to provide suitable support members readily attached to and removed from the wall of the silo which are adapted to secure hydraulic mechanism in place adjacent silage flow regulating members to force the members into the mass of silage and to retract the members as desired to regulate downward flow of silage within the silo.

A still further object is to provide a method of treating silage in a closed silo in which means are provided to substantially equalize pressure interiorly and exteriorly of the silo thus preventing substantial movement of air within the silo which might disturb a blanket or layer of carbon dioxide created adjacent the top of the mass of silage within the silo and in effect permitting the silo to "breathe" without a sudden, strong inrush of air created by changes in atmospheric temperature caused by change from night to day, sunlight, etc.

A still further object is to provide a method of driving a pin through a wall of a silo to support silage and to regulate downward flow of silage within the storage chamber. Other objects of the invention will be readily perceived from the following description.

This invention relates to a storage structure for the storage of silage and like materials from which animals may self-feed which comprises in combination, a base adapted to be open to permit animals to feed from the silage stored therein, a tower-like member supported on the base, a silage separating member placed on the base, pins adapted to extend into the interior of the structure to support silage therein and to regulate flow of silage within the structure to the base, and hydraulic mechanism supported adjacent the wall of the silo to urge pins inwardly of the structure.

This invention further relates to mechanism for urging movement of a pin through the supporting wall of a silo into a mass of silage therein to support the silage and to regulate downward flow thereof which comprises a cylinder containing a piston adapted to move the pin, a removable support for the cylinder to hold the same in desired position on the supporting wall of the silo with the piston adjacent the pin, a hydraulic pump adapted to apply fluid pressure to move the piston, and lines connecting the pump with the cylinder.

This invention further relates to a method of driving a pin through the supporting wall of a silo into a mass of silage therein to support the silage and to regulate downward movement of the silage in which the steps consist in inserting the pin through the wall of the silo and applying hydraulic forces against the outer end of the pin to force the pin within the mass of silage.

The attached drawings illustrate a preferred embodiment of the invention, in which:

FIGURE 1 is a view in elevation of a silo embodying the present invention;

FIGURE 2 is an enlarged fragmentary sectional view of a pin disposed in place in a silo;

FIGURE 4 is an enlarged isometric view of the cylinder support;

FIGURE 5 is an enlarged view in elevation of a modified cylinder support;

FIGURE 6 is a fragmentary sectional view illustrating the silo "breathing" arrangement;

FIGURE 7 is a digrammatic view illustrating the hydrualic mechanism employed to raise the silo partition; and FIGURE 8 is a fragmentary view in section, illustrating the manner in which a pin may be held in place in the structure.

Figure 3:
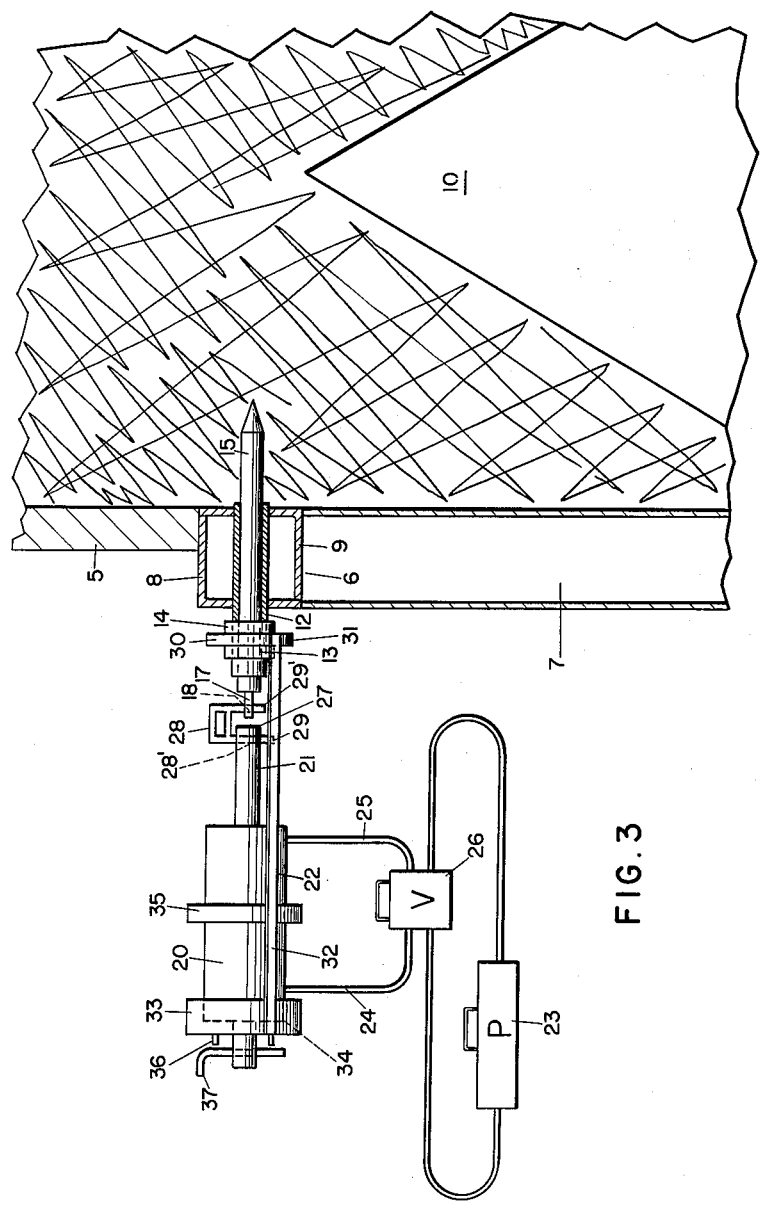
FIGURE 3 is an enlarged fragmentary view, partly in section and partly in elevation, of the hydraulic mechanism in place adjacent the silo to drive a pin into the mass of silage.

Referring to the attached drawings, and particularly to FIGURES 1 and 2, there is shown a twelve-sided silo 2 which includes a concrete foundation 3, a base indicated generally at 4 which is adapted to be open to permit animals to feed from the silage stored therein and a tower 5 supported on the base 4. Base 4 includes a ring-like member 6 extending about the silo upon which the tower is supported and a plurality of spaced supports 7 such as H-beams or upright lolly columns which extend between ring 6 and foundation 3. Ring 6 is formed of L-angles 8, 9 welded together as best shown in FIGURE 2 to form a box as hereinafter explained.

Tower 5 may be formed of concrete staves held together and reenforced by iron bands. A silage separating member 10 which may be in the form of a cone is placed centrally of foundation 3. A two-way valve 11 is placed in the roof of the structure, as hereinafter explained. It will be appreciated the silo if desired may be constructed as shown in my prior patent referred to above or may be formed of steel, wood, etc.

Sleeves 12 extend through the walls formed by the L-angles 8, 9 of ring-like member 6 from the exterior of the silo to its interior. Sleeves 12 are welded to the L-angles to hold the sleeves securely in position within member 6. Spaced collars 13, 14 are welded to a portion of the sleeve extending without the silo as hereinafter explained. Pins or splines 15 having a sharpened end 16 are adapted to extend through the sleeves into the mass of silage. The opposite end of each pin 15 carries a lug 17 having an opening 18 therethrough. These pins 15 when forced into the mass of silage serve as supports therefor and regulate downward flow of silage within the mass. A layer of silage forms on the pins, the silage arching or bridging over the diameter or width of the silo at the pins to retard or prevent downward flow. It will be appreciated the rate of downward flow of silage when the silo is in use for self-feeding may be regulated by the distance the pins extend within the silo, retraction of the pins a desired distance permitting slow downward movement of the mass of silage, the pins preventing any abrupt drop of the heavy mass which might injure feeding animals.

The pins are so constructed as to be located in a supporting or carrying wall thereby transmitting the weight of the silage from the pins through H-beams or upright lolly columns to a firm foundation located in the ground.

It will be appreciated it is desirable that simple, inexpensive means be provided to drive the pins 15 into the mass of silage. For this purpose, hydraulic mechanism is provided. Referring to FIGURE 3, there is shown a cylinder 20 containing a piston 21, adapted to be removably attached in place adjacent the wall of the silo by a suitable support 22, hereinafter described. Cylinder 20 is connected to a hydraulic pump 23 by hoses or lines 24, 25 so that fluid pressure may be applied to the opposite ends of piston 21 to move the piston in a desired direction and to retract the piston to original position. A two-way valve 26 is placed in the lines 24, 25 to permit fluid pressure to be applied to one end of the piston and then to the opposite end of the piston as desired. Preferably, an end 27 of the piston 21 has an opening 28' therethrough. Connecting member 28 has legs 29, 29', leg 29 extending through piston opening 28' while leg 29' extends through opening 18 in the lug 17 of pin 15 to permit hydraulic forces applied to the piston to force the pin within the mass of silage and to retract or remove the pin any suitable distance in the mass thereby regulating downward flow of silage within the silo.

Support 22 includes a semi-circular member 30 terminating in lugs 31 adapted to fit over collar 13 of sleeve 12 to hold the support carrying cylinder 20 adjacent the wall of the silo in position to force the pin 15 within the mass of silage. Legs 32 formed of L-angles extend outwardly from member 30 and are connected at their opposite ends by a collar 33 having a recess and shoulder 34 therein against which the cylinder 20 abuts. If desired, a second collar 35 may be provided placed between member 30 and collar 33 and welded to the legs 32 to serve as an additional reenforcement for the support. The cylinder 20 rests on the legs 32 with an end thereof engaging shoulder 34 of collar 33. Preferably, ears 36 are welded to collar 33; an opening is provided in a portion of the cylinder which protrudes through collar 33. A pin 37 extends through this opening and is adapted to engage the ears 36 to prevent movement of the cylinder in the opposite direction when the mechanism is employed to drive a pin within the mass of silage. It will be understood other suitable supports may be employed, it being necessary only to provide some support means which will hold the cylinder and piston adjacent the wall of the silo and the pin to drive the pin within the mass of silage when the hydraulic mechanism is actuated.

Considering the manner in which the silo is filled, about one-third of the silo is filled with silage and then the pins 15 are disposed in place in the sleeves preliminary to driving the pins within the mass of silage. The support 22 carrying cylinder 20 is positioned adjacent a sleeve 12 with the lugs 31 fitting over collar 13 to hold the support in place. Connecting member 28 is then inserted in openings 18, 28' to connect the piston with the pin. Pump 23 is then actuated manually to apply hydraulic forces to piston 21 contained in cylinder 20 to drive the pin within the mass of silage. The support 22 is then disengaged and applied in the same manner to an adjacent pin to repeat the same operation. Silage in the silo bridges over the pins to form a supporting layer, the silage in effect bridging or arching over the diameter of the silo to restrain the mass from downward flow. If the cone 10 extends a sufficient distance upward in the silo in some cases, the silage bridges or arches between the pins and the apex of the cone. This is ordinarily not necessary, however, to provide adequate support for the mass of silage.

When the silo is placed in use, the animals may self-feed from the mass, proper adjustment of the pins regulating downward flow of the mass to assure a sufficient quantity of silage within the reach of the self-feeding animals and preventing any abrupt drop of the mass in the silage which might injure the self-feeding animals. The hydraulic mechanism may be attached to the pins to retract or withdraw any or all of the pins a desired distance to assure a slow, downward movement of the mass of silage within the reach of the self-feeding animals. It is essential that any sudden drop of the mass be prevented since the mass is so heavy that the self-feeding animals may be seriously injured or killed.

I have found that the use of the hydraulic mechanism greatly decreases the time required to drive in or retract the pin while eliminating the hard arduous labor heretofore required. Indeed, it requires only in the neighborhood of thirty seconds to apply the mechanism to the pin and to drive in the pin as contrasted to the many minutes heretofore required.

In FIGURE 5, I have illustrated a modified form of support which decreases considerably the weight of the support. In this case, the sleeve 40 is provided with an exterior collar 41 formed of two spaced segments 42, 43. Legs 44 terminating in lugs 45 are welded to the cylinder 46 of suitable hydraulic mechanism. In using the mechanism, the pin is inserted through the sleeve, and the hydraulic mechanism is placed in operating position by inserting lugs 45 through the spaces between segments 42, 43. The cylinder is then rotated to bring the lugs to retaining position against the segments and hydraulic forces are applied against the piston of the cylinder to urge the pin within the mass of silage. The pin may be retracted in a similar manner.

If desired, the support may be in the form of a saddle or the like. It will be understood the harness which holds the hydraulic jack could consist of legs that fit in between the rings on the sleeves or a yoke which fits over the sleeves between the rings and to which yoke legs are attached which in turn hold the hydraulic jack.

A silo, generally, is not filled to the roof so that an empty space remains between the mass of silage and the roof. When the silo is in use, this space increases with downward flow of the silage mass in the silo. I have found under these circumstances, initial decomposition of the silage creates carbon dioxide. Since carbon dioxide is heavier than air, a layer or blanket of carbon dioxide forms adjacent the exposed face of the mass of silage preventing contact of air with the silage to prevent spoilage or deteriorization of the silage. Due to changes in atmospheric pressure, as from day to night, and heat stored within the body of the silo, under certain circumstances, pressure in the silo may increase so greatly that air may be forced through pores in the walls of the silo or even cracks form in the silo walls with resulting disturbance of the carbon dioxide layer permitting air to contact the silage. Under other circumstances, atmospheric pressure may increase to a point forcing a sudden inrush of air within the silo space breaking up the carbon dioxide layer and permitting air to contact the exposed face of the silage with consequent spoilage.

It is essential in a closed silo that forcible, sudden, abrupt air movement be prevented to obviate injury to the carbon dioxide layer which protects the exposed silage against spoilage. For this purpose, two-way valve 11 is provided in the roof of the silo. The valve is adjusted so that upon slight changes in pressure between the exterior of the silo and the interior thereof, a slight amount of exterior air may enter the silo or a slight amount of interior air may be discharged from the silo. In both cases, the air movement is gentle and slow so that no substantial interference or disturbance of the carbon dioxide layer is permitted. In effect, the silo "breathes" gently during the storage period and use so that there is no substantial movement of air within the vacant silo space which might break up the carbon dioxide layer or blanket which protects the silage against spoilage. Since air does not contact the silage after the initial protective layer is formed, it will be appreciated the amount of carbon dioxide formed is not excessive so that when necessary the space may be entered without injurious effects to the person who enters the space.

In my prior patent, above recited, I disclose a partition or barrier within the silo during the filling operation which functions to provide a line of cleavage within the silo. This partition is raised in a step by step manner during the filling of the silo. I have found that the hydraulic mechanism described above serves satisfactorily to raise the partition during the filling of the silo.

Referring to FIGURE 7, the partition 50 is connected to a chain 51 which extends upward in the silo and passes over pulleys 51', 52, and then extends downward. Chain 51 is connected to the piston 21 in any suitable manner so that upon a stroke of the piston, the partition is raised a desired distance. It is not necessary to provide any means for holding the partition in place during the filling operation since the mass of silage itself prevents fall of the partition in the silo.

In FIGURE 8, I have shown a sleeve 70 having an opening 71 therein, which extends at an angle to its axis. A pin 72 extends within the sleeve 70 and also has an opening 73 therein aligned with opening 71. A member 74 extends through the openings to prevent the pin being forced outwardly by the compressive forces of the silage.

The present invention provides a self-feeding storage structure which contains inexpensive means to support and to regulate downward flow of silage within the silo. Inexpensive, readily removable, hydraulic mechanism is provided which serves to drive the regulating means within the mass of silage and to retract the means as desired thus eliminating the hard, arduous manual labor heretofore required and greatly decreasing the time heretofore required for the purpose. The supports for the hydraulic mechanism are inexpensive, easily and quickly applied and easily removable. A further advantage of the invention resides in the fact that the hydraulic mechanism may be disposed in place and employed to raise a partition in the silo to form a line of cleavage in the mass of silage during the silo filling operation.

While I have described a preferred embodiment of the invention, it will be understood that the invention is not limited thereto since it may be otherwise embodied within the scope of the following claims.

I claim:

1. In a storage structure for the storage of silage and like materials from which animals may self-feed, the combination of a foundation for the structure, a base supported on the foundation adapted to be open to permit animals to feed from the silage stored therein, a tower-like member supported on the base, sleeves having substantially smooth interior surfaces attached to the base extending from the exterior of the structure to the interior thereof, said sleeves having collar-like members therein exteriorly of the structure adapted to engage removable hydraulic mechanism, pins placed in said sleeves extending into the interior of the structure to support silage thereon and to regulate downward flow of silage within the structure to the foundation, and removable hydraulic mechanism having means to engage a collar-like member of a sleeve to secure a portion of the mechanism in place adjacent a pin and including a piston to urge the pin inwardly of the structure.

2. A structure according to claim 1 in which the mechanism includes a connecting member to connect the piston and the pin to move the pin inwardly of the structure and to retract the pin upon movement of the piston in the opposite direction.

3. A structure according to claim 1 in which the hydraulic mechanism includes a cylinder carrying a piston, and a support for the cylinder which includes lugs to fit over the sleeve collar, members extending therefrom to form a support for the cylinder, and a collar attached to the opposite ends of said members, said collar attached to said members having a shoulder therein which engages an end of the cylinder.

4. A structure according to claim 1 in which the sleeves are provided with openings extending at an angle to the axes thereof, said pins having similar openings adapted to align therewith when the pins are urged inwardly, and members extending through the openings to prevent the pins being forced outwardly by the compressive forces of the silage.

5. In a storage structure for the storage of silage and like materials from which animals may self-feed, the combination of a foundation for the structure, a base adapted to be open to permit animals to feed from the silage stored therein, said base including a ring-like member extending about the structure, a plurality of spaced supports extending between the member and the foundation, a silage separating member placed on the foundation and extending upwardly in the structure, a tower-like member supported on the ring-like member, sleeves fixed to and extending through the ring-like member having substantially smooth interior surfaces, said sleeves having collar-like members thereon exteriorly of the structure adapted to engage removable hydraulic mechanism, pins extending through the sleeves adapted to support silage thereon and to regulate downward flow of silage within the structure to the foundation, the weight of the silage supported by the pins being transmitted to the foundation through the base, and removable hydraulic mechanism including a piston to urge the pin inwardly of the structure and having a support for the piston including means to engage the collar-like member to secure the piston in place adjacent the pin.

6. A structure according to claim 5 in which a connecting member is provided to connect the piston and the pin to move the pin inwardly upon movement of the piston in one direction and to retract the pin upon movement of the piston in the opposite direction.

7. A structure according to claim 6 in which the hydraulic mechanism includes a cylinder carrying the piston, the support therefor comprising horizontally extending members, lugs connecting ends of the horizontally extending members fitting over the sleeve collar, and a collar attached to the opposite ends of said members, said collar attached to the members having a shoulder therein which engages an end of the cylinder.

8. A structure according to claim 5 in which the ring-like member is formed of L-shaped angles welded together to form a box-like member, the sleeves extending through the walls of the box-like member.

(References on following page)

References Cited in the file of this patent

UNITED STATES PATENTS

| | | |
|---|---|---|
| 101,681 | Towle | Apr. 5, 1870 |
| 409,008 | Breymann | Aug. 13, 1889 |
| 1,139,488 | Christopher | May 18, 1915 |
| 1,585,931 | Mabee | May 25, 1926 |
| 2,127,856 | Blood | Aug. 23, 1938 |
| 2,162,922 | Schmidt | June 20, 1939 |
| 2,213,127 | Kerschbaum et al. | Aug. 27, 1940 |
| 2,365,862 | Bufton | Dec. 26, 1944 |
| 2,638,871 | Ruedemann | May 19, 1953 |
| 2,691,959 | Dueringer | Oct. 19, 1954 |
| 2,752,884 | Mazur | July 3, 1956 |
| 2,752,885 | Mazur | July 3, 1956 |